(12) United States Patent
Peng et al.

(10) Patent No.: US 10,484,100 B2
(45) Date of Patent: Nov. 19, 2019

(54) OPTICAL MODULE, OPTICAL MODULE SYSTEM AND MONITOR METHOD USING THE SAME

(71) Applicant: Source Photonics (Chengdu) Company, Ltd., Chengdu (CN)

(72) Inventors: Qi Peng, Chengdu (CN); Guoqiang Wang, Chengdu (CN); Yongmeng Tian, Chengdu (CN); Huan Jiang, Chengdu (CN); Chaoyuan Sun, Chengdu (CN); Hong Yang, Chengdu (CN)

(73) Assignee: Source Photonics (Chengdu) Co. Ltd., Chengdu, Sichuan (CN)

( * ) Notice: Subject to any disclaimer, the term of this patent is extended or adjusted under 35 U.S.C. 154(b) by 0 days.

(21) Appl. No.: 15/750,076

(22) PCT Filed: Aug. 25, 2017

(86) PCT No.: PCT/CN2017/099172
§ 371 (c)(1),
(2) Date: Feb. 2, 2018

(87) PCT Pub. No.: WO2019/037128
PCT Pub. Date: Feb. 28, 2019

(65) Prior Publication Data
US 2019/0068285 A1    Feb. 28, 2019

(51) Int. Cl.
*H04B 10/85*    (2013.01)
*G08C 17/02*    (2006.01)
(Continued)

(52) U.S. Cl.
CPC .............. *H04B 10/85* (2013.01); *G08C 17/02* (2013.01); *H03M 13/093* (2013.01);
(Continued)

(58) Field of Classification Search
CPC .............. H04B 10/85; H04L 29/06782; H04W 12/0608; G08C 17/02; H03M 13/093
See application file for complete search history.

(56) References Cited

U.S. PATENT DOCUMENTS

| 9,641,254 B1 | 5/2017 | Shen et al. |
| 2012/0032776 A1* | 2/2012 | Wu .................... G08C 17/02 340/5.6 |

(Continued)

FOREIGN PATENT DOCUMENTS

| CN | 102164006 A | 8/2011 |
| CN | 102255656 A | 11/2011 |

(Continued)

OTHER PUBLICATIONS

Yu Pei; "Automatic Control Method for Extinction Ratio of Photovoltaic Conversion Module"; Bibliographic Data of CN105656562 (A); Jun. 8, 2016; https://worldwide.espacenet.com.

(Continued)

*Primary Examiner* — Casey L Kretzer
(74) *Attorney, Agent, or Firm* — Andrew D. Fortney; Central California IP Group, P.C.

(57) ABSTRACT

The present invention relates to an optical module and optical module system using the same. The optical module comprises a transceiving unit, an antenna and an MCU. The transceiving unit receives control commands from one or more control computers via the antenna and transfers them to the MCU. Then the MCU processes the control commands and provides feedback information to the one or more control computers through the transceiving unit. In the optical module of the present invention, as a result of an additional IOT wireless unit, the optical module is capable of communicating with remote control computers, thereby achieving remote testing and control for optical modules, (Continued)

instead of using conventional control methods for optical modules.

20 Claims, 4 Drawing Sheets

(51) Int. Cl.
    *H04W 12/06*    (2009.01)
    *H04L 29/06*    (2006.01)
    *H03M 13/09*    (2006.01)
    *H04B 10/114*    (2013.01)
    *H04B 10/40*    (2013.01)

(52) U.S. Cl.
    CPC ......... *H04B 10/1143* (2013.01); *H04B 10/40* (2013.01); *H04L 29/06782* (2013.01); *H04L 63/083* (2013.01); *H04W 12/0608* (2019.01)

(56) References Cited

U.S. PATENT DOCUMENTS

| | | | |
|---|---|---|---|
| 2014/0162624 A1* | 6/2014 | Gold | H04M 1/7253 455/420 |
| 2015/0223277 A1* | 8/2015 | Jovicic | H04W 76/14 455/41.2 |
| 2017/0195053 A1 | 7/2017 | Duthel | |

FOREIGN PATENT DOCUMENTS

| | | |
|---|---|---|
| CN | 102710334 A | 10/2012 |
| CN | 103684607 A | 3/2014 |
| CN | 105656562 A | 6/2016 |

OTHER PUBLICATIONS

Zhang Huaitian; "Wireless Optical Fiber Transceiver"; Bibliographic Data of CN103684607 (A); Mar. 26, 2014; https://worldwide.espacenet.com.

Wuping Zhang et al.; "40G CFP Optical Module for Long-Distance Transmission"; Bibliographic Data of CN102710334 (A); Oct. 3, 2012; https://worldwide.espacenet.com.

Chen Gang et al.; "Dual-Channel Compact Small From-Factor Pluggable Circuit"; Bibliographic Data of CN102164006 (A); Aug. 24, 2011; https://worldwide.espacenet.com.

Chen Gang et al.; "Optical Network Unit for Passive Optical Network and Signal Processing Method Thereof"; Bibliographic Data of CN102255656 (A); Nov. 23, 2011; https://worldwide.espacenet.com.

International Search Report and Written Opinion dated May 22, 2018; International Application No. PCT/CN2017/099172; 10 pages; International Searching Authority/China, State Intellectual Property Office of the People's Republic of China; Beijing, China.

* cited by examiner

OPTICAL MODULE, OPTICAL MODULE SYSTEM AND MONITOR METHOD USING THE SAME

This application is a national phase application of International Application No. PCT/CN2017/099172, filed Aug. 25, 2017, incorporated herein by reference in its entirety.

FIELD OF THE INVENTION

The present invention relates to the field of optical communication technology, especially to optical modules with IOT functions, optical module systems and monitoring methods using the same.

DISCUSSION OF THE BACKGROUND

An optical module is a device for converting optical signals into electrical signals or electrical signals into optical signals and signal processing. In conventional optical modules, testing and control of optical modules is realized by connecting a system main board using connectors. However, the connection using connectors employs wired connections that cost much, function as slave devices to the communication system operators, and prevent users from testing and controlling the optical modules independently.

SUMMARY OF THE INVENTION

The present invention is intended to provide an optical module, optical module system and monitoring method using the same. The optical module is integrated with IOT functions that can provide wireless communication with control computers such as router or other network controllers, thereby achieving remote testing and control.

In order to implement the above-mentioned purposes, the present invention provides a technical scheme as follows: an optical module comprises a transceiving unit, an antenna, and a microcontroller unit or MCU. The transceiving unit is configured to receive control commands from a control computer via the antenna and transmit the control commands to the MCU. The MCU is configured to process the control commands, provide feedback information and transmit the feedback information to the control computer via the transceiving unit. As the above-mentioned optical module is integrated with an IOT wireless unit, it can do wireless communication with a remote control computer, receive control commands from the control computer, or upload information to the control computer, thereby achieving testing and control of the optical module by the control computer, and getting around restrictions by system or communication operators. The MCU can be an MCU in a traditional optical module or a built-in coprocessor in an IOT wireless unit. Using the MCU in a traditional optical module to transmit control commands from the control computer can reduce the improvement cost and the structure of the traditional optical module. Alternatively, using the built-in coprocessor in a traditional optical module to transmit or process control commands from the control computer can be compatible with the relatively poor performance of the MCU in a traditional optical module.

In the above-mentioned optical module, the MCU comprises a command execution unit configured to execute control commands from the control computer, and an information feedback unit configured to report corresponding feedback information such as command execution accomplished or command execution failed to the control computer.

In the above-mentioned optical module, the MCU and the transceiving unit start initiation when they are powered on. When the initiation is done, the MCU and the transceiving unit intercommunicate to determine if predetermined commands need to be executed. If yes, the predetermined commands are executed in order of priority. After that, a power supply chip in the optical module is enabled via an I/O port of the MCU to power up low-speed data channels. When the MCU detects or determines that the low-speed data channels work properly, it enables high-speed data channels.

Embodiments of the present invention further provide an optical module system. The system includes the optical module of the present invention, and a control or computer configured to transmit control commands to the optical module and receive feedback information from the optical module.

In an alternative embodiment of the present invention, the above-mentioned system further comprises a connector into which the optical module can be plugged. The connector can transmit control commands to the optical module by wire communication and obtain feedback information from the optical module. With the connector, the optical module can not only communicate with the control computer in wireless mode, thereby achieving remote testing and control, but can also be connected with the system main board by wired communication, thereby achieving local testing and control, without any interaction effects.

Embodiments of the present invention further provide a monitoring method for the optical module of the present invention, comprising: receiving control commands in an optical module from one or more control computers; executing the control commands in the optical module and providing the one or more control computers with feedback information from the optical module.

Relative to the prior art, as an IOT wireless unit, transceiving unit and antenna are added to the optical module of the present invention, the optical module can communicate with remote control computers, thereby achieving remote testing and control of the optical module and reducing the cost of the optical module greatly. The present invention redefines the control method of conventional optical modules such that users can test and control optical modules freely instead of being restricted by communication or system operators.

BRIEF DESCRIPTION OF THE DRAWINGS

These and other objects and advantages of the present invention will become apparent to those skilled in the art upon review of the following detailed description of various embodiments and/or the accompanying drawings.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments.

On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Figure 1:
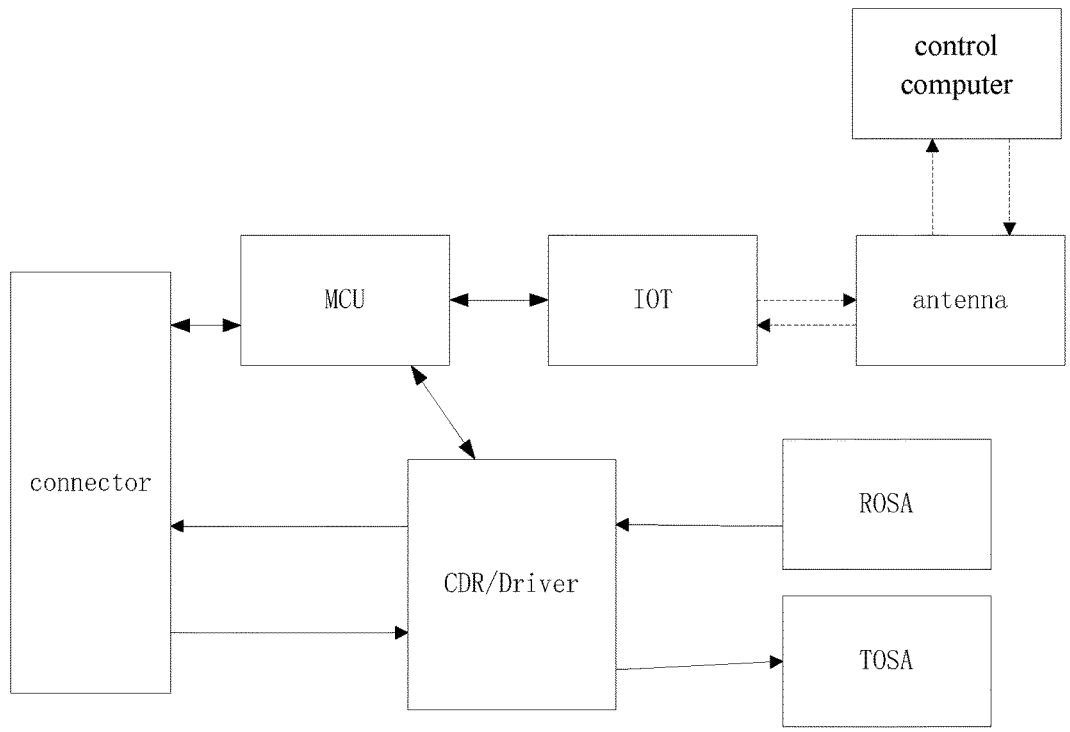
FIG. 1 is a structure diagram showing an optical module in accordance with one or more embodiments of the present invention.

In FIG. 1, bidirectional solid arrows represent low-speed data channels, and unidirectional solid arrows represent high-speed data channels. The high-speed data channels can be standard information transmission channels (for example, 10M, 100M, 1G, etc.), while the low-speed data channel can be an IIC transmission channel, having a rate lower than 10M. Unidirectional dotted arrows represent wireless transmission channels. As shown in FIG. 1, the optical module comprises: an IOT wireless unit including a transceiving unit that exchanges data with an MCU over a low-speed data channel and an antenna through which wireless signal communication between the transceiving unit and a control computer can be executed; a CDR/Driver (clock data recovery unit/laser driver) that exchanges data with the MCU over a low-speed channel and with each of a ROSA and a TOSA over a respective high-speed channel. The ROSA is configured to receive optical signals and convert the optical signals to electrical signals, while the TOSA is configured to convert electrical signals to optical signals and transmit the optical signals.

In one embodiment, the MCU can be an MCU in conventional optical module. That is to say, the optical module's MCU is utilized to process control commands from a control computer and give feedback information to the control computer, as shown in FIG. 1. In another embodiment, the MCU is a built-in MCU (coprocessor) in a IOT wireless unit. The IOT wireless unit comprises a transceiving unit, an antenna and a coprocessor. The coprocessor is utilized to process control commands from the control computer and to give feedback information to the control computer.

The above-mentioned optical module can receive control commands, such as test commands, from the control computer using the antenna. The feedback information after the MCU executes the commands can be transmitted to the transceiving unit and then to the control computer via the antenna, thereby achieving communication with the control computer without any interaction effects between the optical module and the control computer. For example, the ROSA receives optical signals and the TOSA transmits optical signals as in conventional optical modules. The control computer may be any device that can transmit control commands wirelessly and receive feedback information from the optical module, but is not limited to a single device such as a PC.

Figure 3:
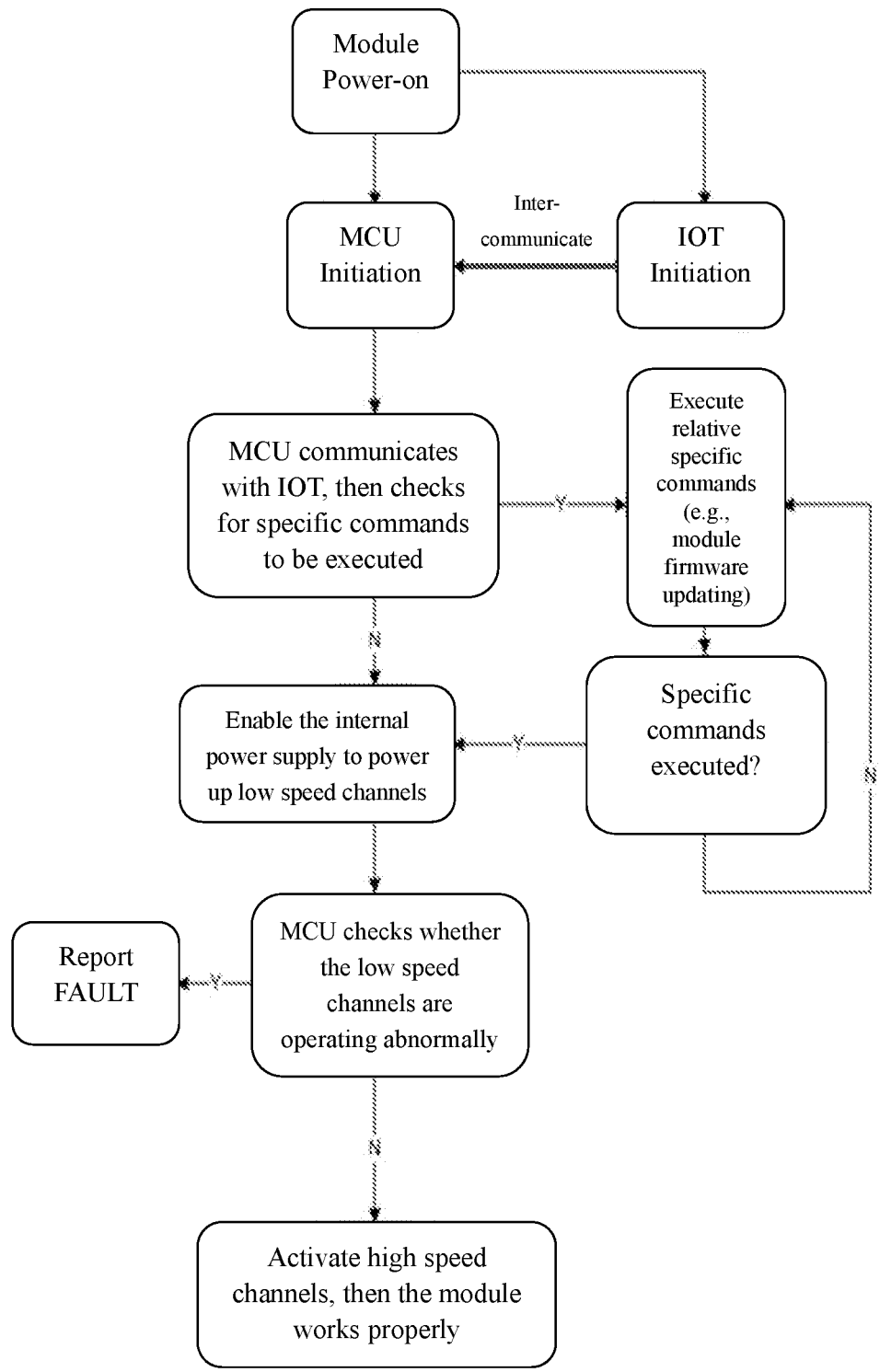
FIG. 3 is a flow chart showing powering on an optical module in accordance with one or more embodiments of the present invention.

As the application of the IOT wireless unit, the power-on process of the optical module of the present invention is different from that of conventional optical modules. After a conventional optical module is plugged into a connector, the conventional optical module is powered up via a golden finger on the optical module. Then, the MCU starts initiation when powered up. The MCU enables an internal power supply chip via an I/O port to power up the low-speed data channel of the optical module after initiation is done. Then, when the MCU detects that the low-speed data channel is working properly, it enables the high-speed data channels, thereby putting the optical module in smooth operation. As shown in FIG. 3, both the MCU and the transceiving unit start initiation after power on, and communication can proceed between the MCU and the transceiving unit to determine whether predetermined commands (for example, to update and/or backup firmware) need to be executed. If yes, the MCU may execute the predetermined commands preferentially, then enable an internal power supply chip via an I/O port of the MCU to power up the low-speed data channels, and then enable the high-speed data channels (so that the optical module works properly) after detecting that the low-speed data channels work properly.

Figure 2:
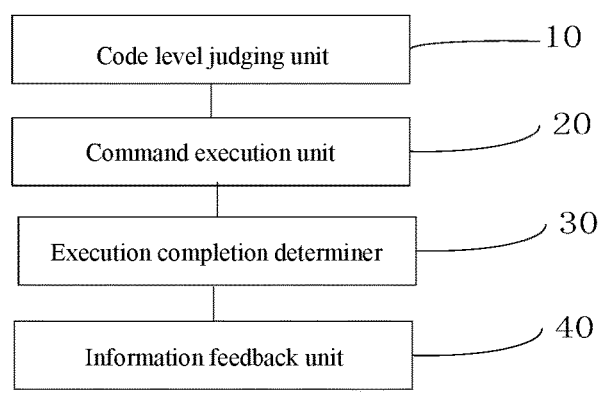
FIG. 2 is a functional block diagram showing an optical module in accordance with one or more embodiments of the present invention.

More specifically, test and control of optical modules does not proceed at all times, and there is no need for that. Thus, the IOT wireless unit can work at a regular or predetermined time and work on demand with less power consumption. Theoretically, the transceiving unit transmits control commands to the MCU after the transceiving unit receives control commands from the control computer. However, the time difference between the two actions is measured by milliseconds or less, so the information output of the two actions can be considered synchronous. FIG. 2 shows functional units of an MCU in the optical module of the present invention. The MCU comprises the following functional units: a password level determiner 10 configured to check or determine whether the password level is qualified or correct for executing control commands on code stored for example in a memory associated with the MCU; a command execution unit 20 configured to execute control commands from the control computer when the password level determiner 10 gives an affirmative result; an execution completion judging unit or determiner 30; and an information feedback unit 40 configured to provide feedback or information about control command execution failure to the control computer when the password level determiner 10 gives a negative result, about command execution fulfillment to the control computer when the result from the execution completion judging unit or determiner 30 is affirmative, and about command execution failure to the control computer when the result from the execution completion judging unit or determiner 30 is negative.

In the above-mentioned optical module, the password level determiner 10 is configured to verify the validity of stored code and determine the password or security level of the stored code. In general, different users have different password or security levels, and different password or security levels correspond to different operation authorities. If the password is invalid or the level is not qualified or correct, the command execution unit 20 will receive a command of inexecution, and the information feedback unit 40 will transmit information about commands being unable to execute to the control computer. When the password level is qualified or correct, the command execution unit 20 can execute received control commands. The execution results may comprise normal execution or abnormal execution. When the execution is done, the information feedback unit 40 reports the execution results to the control computer. The control security of the optical module can be guaranteed through password verification and multilevel password configuration.

On one hand, the optical module of the present invention can work with external computers to achieve remote test and control. On the other hand, the optical module can also cooperate with connectors just like conventional optical modules. In this situation, the connector transmits control commands from a system main board to the MCU via one or more wires, and feeds back information to the system main board using the one or more wires after the MCU executes the control commands. As shown in FIG. 1, the MCU and the connector exchange data via a low-speed data channel having a narrow transmission band, and the CDR/Driver and the connector exchange data via high-speed data channels. A monitoring method using the optical module of the present invention comprises: receiving control commands in the optical module from one or more control computers; transmitting control commands from the one or more control computers to the optical module by wireless communication, the optical module receiving the control commands via an antenna and transmitting them to an MCU; determining whether the password level for example of stored code is qualified or correct for the MCU to execute the control commands; if not, providing feedback information about an inexecutable control command to the control computer; if yes, executing the control commands and checking whether execution of the control commands is completed; if yes, providing feedback information about completed control command execution to the control computer; if not, providing feedback information about abnormal control command execution to the control computer. The monitoring method will be explained in greater detail below with regard to exemplary embodiments.

Figure 4:
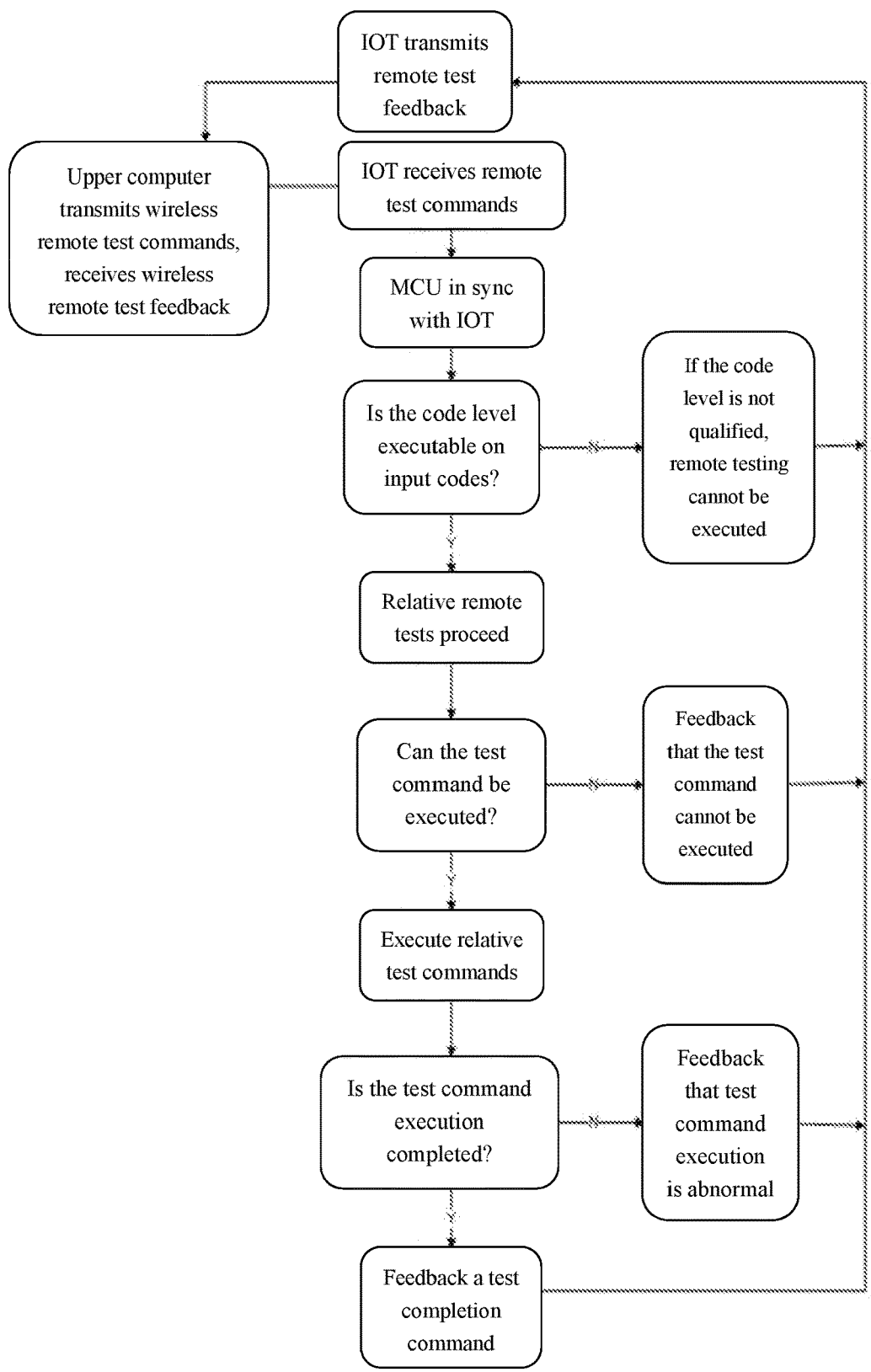
FIG. 4 is a flow chart showing remote testing of an optical module in accordance with one or more embodiments of the present invention.

FIG. 4 is a flow chart of a remote test process and a monitoring method for remote test commands. The method comprises: transmitting remote control commands from a control computer to an optical module; receiving the remote test commands in an IOT wireless unit of the optical module from the control computer; and determining whether a password level is qualified or correct for executing the remote commands on stored code, for example in a memory associated with the MCU. When the password is invalid or the password level is not qualified or correct, the method includes transmitting feedback information about an inexecutable remote test command to the control computer; when the password level is qualified or correct, the method includes executing corresponding remote tests. The MCU of the optical module checks or determines whether the remote test commands are executable; if not, feedback information is returned about an inexecutable test command to the control computer; if yes, the remote test commands are executed. After executing the corresponding remote test commands, the MCU of the optical module checks or determines whether remote test command execution is done. If yes, feedback information is returned about command execution completion to the control computer; if not, feedback information is returned about abnormal command execution to the control computer.

Figure 5:
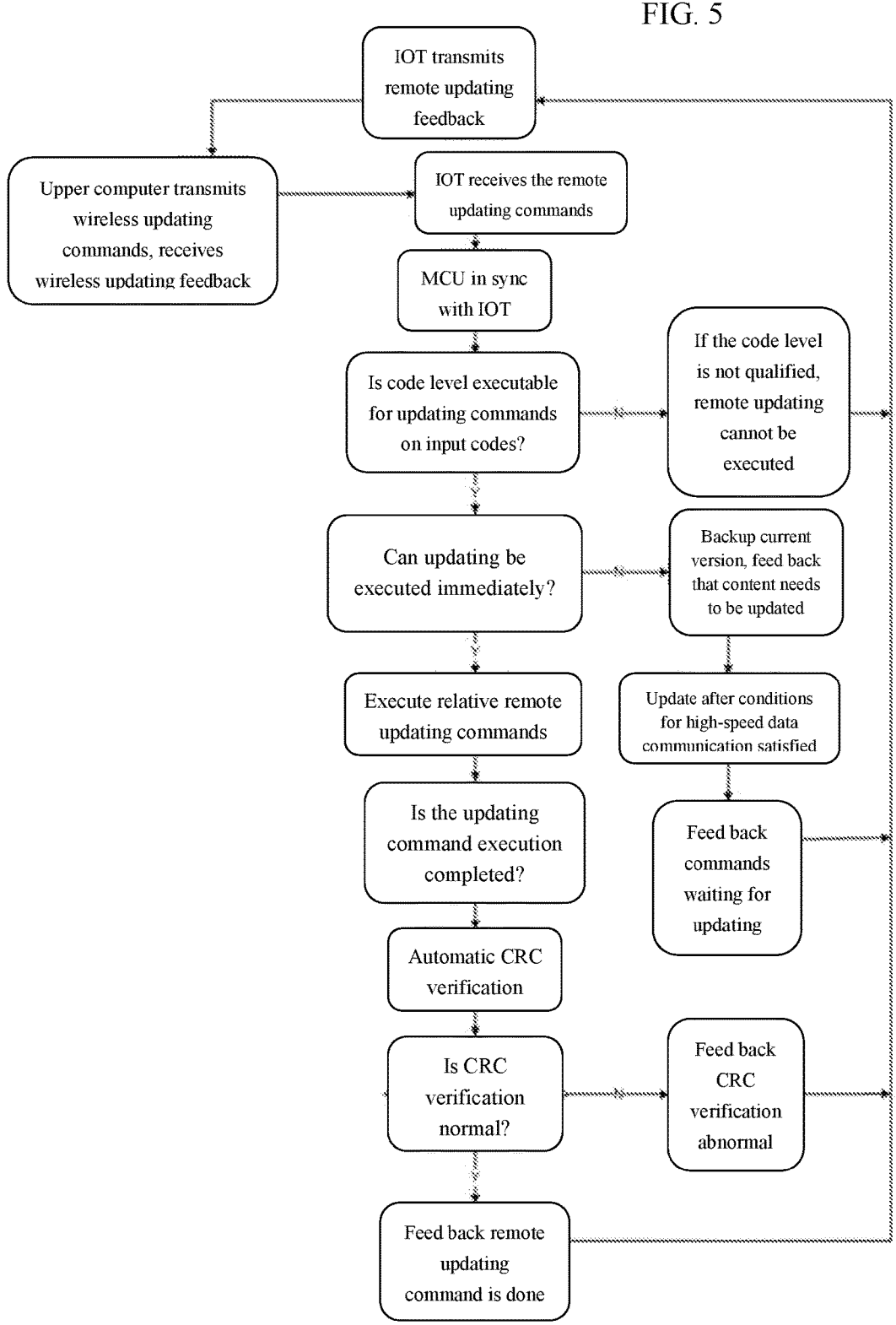
FIG. 5 is a flow chart showing remote updating of an optical module in accordance with one or more embodiments of the present invention.

FIG. 5 is a flow chart of remote updating and a monitoring method for remote updating commands. The method comprises: transmitting remote updating commands from a control computer to an optical module; receiving the remote updating commands from the control computer in an IOT wireless unit of the optical module; determining whether a password level is qualified or correct for executing the remote updating commands on stored code; when the password is invalid or the password level is not qualified or correct, transmitting feedback information about an inexecutable remote updating command to the control computer; when the password level or version is qualified or correct, using the MCU of the optical module, substantially immediately determining whether the remote updating commands are executed; if not, backing up stored code or firmware (that is, the content to be updated) and waiting until conditions for communication over high-speed data channels are met and returning feedback information about suspended updating to the control computer; if yes, executing the remote updating command; then, checking whether the remote updating commands have been executed; if not, returning feedback information about abnormal command execution to the control computer; if yes, performing CRC verification, and checking whether the result of CRC verification is regular; if yes, providing feedback information about command execution completion to the control computer, otherwise feeding back information about abnormal command execution to the control computer. After executing the remote test commands, the MCU of the optical module checks or determines whether remote updating command execution is done; if yes, the method comprises returning feedback information about command execution completion to the control computer; if not, the method comprises returning feedback information about abnormal command execution to the control computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An optical module, comprising a transceiving unit, an antenna, and a microcontroller unit (MCU), the transceiving unit being configured to receive control commands from a control computer via the antenna and transmit the control commands to the MCU, the MCU being configured to process the control commands, provide feedback information and transmit the feedback information to the control computer via the transceiving unit, wherein the MCU and the transceiving unit start initiation after power on, and the MCU and the transceiving unit communicate to determine whether predetermined commands need to be executed; if yes, the MCU executes the predetermined commands; after that, the MCU enables an internal power supply chip via an I/O port of the MCU to power up low-speed data channels, then enable high-speed data channels when proper operation of the low-speed data channels is detected.

2. The optical module of claim 1, wherein the MCU comprises: a command execution unit configured to execute control commands from the control computer; and an information feedback unit configured to provide feedback information about command execution fulfillment or command execution failure to the control computer after the command execution unit executes the control commands.

3. The optical module of claim 2, wherein the MCU further comprises a password level determiner configured to check or determine whether a password level is qualified or correct for executing the control commands on stored code; the command execution unit is further configured to execute the control commands from the control computer when the password level determiner gives an affirmative result; and the information feedback unit is further configured to provide feedback information about control command execution failure to the control computer when the password level determiner gives a negative result.

4. The optical module of claim 3, wherein the control commands comprise a remote test command configured to (i) check or determine whether the remote test command can be executed when the result from the password level determiner is affirmative, and (ii) execute the remote test command when the result from the password level determiner is affirmative; and the information feedback unit is further configured to provide feedback information about test command execution failure to the control computer when a result from the command execution unit is negative.

5. The optical module of claim 4, wherein the MCU further comprises an execution completion judging unit and an automatic check unit; the execution completion judging unit is configured to check or determine whether execution of the remote test command is completed; the information feedback unit is further configured to provide feedback information about command execution failure to the control computer when a result from the execution completion judging unit is negative, perform CRC verification if a result from the execution completion judging unit is affirmative, and provide (i) feedback information about abnormal CRC verification to the control computer when CRC verification is abnormal or (ii) feedback information about normal CRC verification to the control computer when CRC verification is normal.

6. The optical module of claim 3, wherein the control commands comprise a remote updating command configured to be executed immediately in response to the affirmative result from the password level determiner, otherwise backup content that needs to be updated; and the information feedback unit is further configured to provide feedback information about pending updating to the control computer when a result from the command execution unit is negative.

7. An optical module system, comprising the optical module as claimed in claim 1 and the control computer, wherein the control computer is configured to transmit control commands to the optical module and receive feedback information from the optical module.

8. The optical module system of claim 7, further comprising a connector configured to receive the optical module, transmit control commands to the optical module via one or more wires, and obtain feedback information from the optical module.

9. A method of monitoring an optical module, comprising:
wirelessly receiving control commands from a control computer in an optical module;
executing the control commands in the optical module; and
wirelessly transmitting feedback information relating to execution of the control commands from the optical module to the control computer, wherein:
executing the control commands and transmitting feedback information to the control computer comprises checking whether a level of a password is qualified or correct for executing the control commands; if yes, then executing the control commands; if not, then wirelessly transmitting feedback information about the optical module being unable to execute the control commands to the control computer;
the level of the password comprises an executable control command, and executing the control commands comprises executing the executable control command, and checking whether the executable control command is executed; if yes, then wirelessly transmitting feedback information about control command execution completion to the control computer, if not, then wirelessly transmitting feedback information about control command execution failure to the control computer; and
the executable control command further comprises a remote test command, and executing the executable control command comprises checking whether the remote test command is executable; if yes, then executing the remote test command: and if not, then wirelessly transmitting feedback information about the optical module being unable to execute to the control computer.

10. The method of claim 9, wherein the control commands comprise a remote updating command, and executing the control commands further comprises:
checking whether the remote updating command needs to be executed immediately; if yes, then executing the remote updating command; and if not, then backing up content that needs to be updated, updating the content when conditions for communication over high-speed channels are satisfied, and wirelessly transmitting feedback about the optical module waiting for updating to the control computer.

11. The method of claim 10, wherein wirelessly transmitting feedback information about command execution completion to the control computer comprises: performing CRC verification after executing the remote updating command; if the verification result is normal, providing feedback information about command execution completion to the control computer; and if the verification result is not normal, providing feedback information about abnormal CRC verification to the control computer.

12. The method of claim 9, further comprising: receiving the control command in the optical module from a system board through an antenna; executing the control command in the optical module; and providing the feedback information to the system board.

13. The method of claim 9, wherein the optical module comprises a transceiving unit, an antenna, and an MCU, the transceiving unit being configured to receive the control commands from the control computer via the antenna and transmit the control commands to the MCU, the MCU being configured to process the control commands and transmit the feedback information to the control computer via the transceiving unit and the antenna.

14. An optical module, comprising a transceiving unit, an antenna, and a microcontroller unit (MCU), the transceiving unit being configured to receive control commands from a control computer via the antenna and transmit the control commands to the MCU, the MCU being configured to process the control commands, provide feedback information and transmit the feedback information to the control computer via the transceiving unit, wherein:
the MCU comprises a command execution unit configured to execute control commands from the control computer, an information feedback unit configured to provide feedback information about command execution fulfillment or command execution failure to the control computer after the command execution unit executes the control commands, and a password level determiner configured to check or determine whether a password level is qualified or correct for executing the control commands on stored code;

the command execution unit is further configured to execute the control commands from the control computer when the password level determiner gives an affirmative result;

the control commands comprise a remote test command configured to (i) check or determine whether the remote test command can be executed when the result from the password level determiner is affirmative, and (ii) execute the remote test command when the result from the password level determiner is affirmative; and the information feedback unit is further configured to provide feedback information to the control computer about (i) control command execution failure when the password level determiner gives a negative result, and (ii) test command execution failure when a result from the command execution unit is negative.

15. The optical module of claim 14, wherein the MCU further comprises an execution completion judging unit configured to check or determine whether the remote test command is executed; and the information feedback unit is further configured to provide feedback information about command execution failure to the control computer when the result from the execution completion judging unit is negative or about command execution fulfillment to the control computer when the result from the execution completion judging unit is affirmative.

16. The optical module of claim 14, wherein the MCU and the transceiving unit start initiation after power on, and the MCU and the transceiving unit communicate to determine whether predetermined commands need to be executed; if yes, the MCU executes the predetermined commands; after that, the MCU enables an internal power supply chip via an I/O port of the MCU to power up low-speed data channels, then enable high-speed data channels when proper operation of the low-speed data channels is detected.

17. An optical module, comprising a transceiving unit, an antenna, and a microcontroller unit (MCU), the transceiving unit being configured to receive control commands from a control computer via the antenna and transmit the control commands to the MCU, the MCU being configured to process the control commands, provide feedback information and transmit the feedback information to the control computer via the transceiving unit, wherein:

the MCU comprises a command execution unit configured to execute control commands from the control computer, an information feedback unit configured to provide feedback information about command execution fulfillment or command execution failure to the control computer after the command execution unit executes the control commands, a password level determiner configured to check or determine whether a password level is qualified or correct for executing the control commands on stored code, an execution completion judging unit and an automatic check unit;

the command execution unit is further configured to execute the control commands from the control computer when the password level determiner gives an affirmative result;

the control commands comprise a remote updating command configured to be executed immediately in response to the affirmative result from the password level determiner, otherwise backup content that needs to be updated;

the information feedback unit is further configured to provide feedback information about pending updating to the control computer when a result from the command execution unit is negative;

the execution completion judging unit is configured to check or determine whether execution of a remote test command is completed; and the information feedback unit is configured to (i) provide feedback information to the control computer about (a) command execution failure when (1) a result from the execution completion judging unit is negative or (2) the password level determiner gives a negative result, and (b) test command execution failure when the result from the command execution unit is negative, (ii) perform CRC verification if the result from the execution completion judging unit is affirmative, and (iii) provide feedback information about abnormal CRC verification to the control computer when CRC verification is abnormal, or feedback information about normal CRC verification to the control computer when CRC verification is normal.

18. The optical module of claim 17, wherein the control commands further comprise the remote test command; the remote test command is configured to (i) check or determine whether the remote test command can be executed when the result from the password level determiner is affirmative, and (ii) execute the remote test command when the result from the password level determiner is affirmative; and the information feedback unit is further configured to provide feedback information about test command execution failure to the control computer when a result from the command execution unit is negative.

19. The method of claim 18, wherein the executable control command comprises a remote test command, and executing the executable control command comprises:

checking whether the remote test command is executable; if yes, then executing the remote test command; and if not, then wirelessly transmitting feedback information about the optical module being unable to execute to the control computer.

20. A method of monitoring an optical module, comprising:

wirelessly receiving control commands from a control computer in an optical module;

executing the control commands in the optical module; and wirelessly transmitting feedback information relating to execution of the control commands from the optical module to the control computer, wherein:

executing the control commands and transmitting feedback information to the control computer comprises checking whether a level of a password is qualified or correct for executing the control commands; if yes, then executing the control commands; if not, then wirelessly transmitting feedback information about the optical module being unable to execute the control commands to the control computer;

the level of the password comprises an executable control command, and executing the control commands comprises (i) executing the executable control command, and (ii) checking whether the executable control command is executed; if yes, then wirelessly transmitting feedback information about control command execution completion to the control computer, if not, then wirelessly transmitting feedback information about control command execution failure to the control computer; and the control commands comprise a remote updating command, and executing the control commands further comprises checking whether the remote updating command needs to be executed immediately; if yes, then executing the remote updating command; and if not, then backing up content that needs to be updated, updating the content when conditions for communication over high-speed channels are satisfied, and wirelessly transmitting feedback about the optical module waiting for updating to the control computer.

* * * * *